(12) United States Patent
Crowther et al.

(10) Patent No.: US 10,452,428 B2
(45) Date of Patent: Oct. 22, 2019

(54) APPLICATION EXECUTION WITH OPTIMIZED CODE FOR USE PROFILES

(71) Applicant: International Business Machines Corporation, Armonk, NY (US)

(72) Inventors: Fiona M. Crowther, Manchester (GB); Geza Geleji, Hursley (GB); Christopher J. Poole, Hursley (GB); Martin A. Ross, Hursley (GB); Craig H. Stirling, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 15/068,722

(22) Filed: Mar. 14, 2016

(65) Prior Publication Data

US 2017/0262309 A1 Sep. 14, 2017

(51) Int. Cl.
*G06F 9/445* (2018.01)
*G06F 9/48* (2006.01)
*G06F 8/41* (2018.01)

(52) U.S. Cl.
CPC .............. *G06F 9/485* (2013.01); *G06F 8/443* (2013.01); *G06F 9/44536* (2013.01)

(58) Field of Classification Search
CPC ............. G06F 9/44536; G06F 9/44505–44578
See application file for complete search history.

(56) References Cited

U.S. PATENT DOCUMENTS

| | | | |
|---|---|---|---|
| 7,065,754 B1 * | 6/2006 | Coutant | G06F 9/44547 712/36 |
| 7,877,734 B2 | 1/2011 | Branda et al. | |
| 8,578,355 B1 * | 11/2013 | Mars | G06F 8/443 717/153 |
| 8,819,649 B2 | 8/2014 | Lafreniere et al. | |
| 9,081,587 B1 * | 7/2015 | Li | G06F 8/443 |
| 9,134,980 B1 | 9/2015 | Cabrera et al. | |
| 2003/0066060 A1 | 4/2003 | Ford | |

(Continued)

OTHER PUBLICATIONS

Dynamic Feedback: An Effective Technique for Adaptive Computing Pedro Diniz and Martin Rinard Published 1997.*

(Continued)

*Primary Examiner* — Emerson C Puente
*Assistant Examiner* — Paul V Mills
(74) *Attorney, Agent, or Firm* — Cantor Colburn LLP; Scott Dobson

(57) ABSTRACT

Method and system are provided for software application execution including switching between optimized code for use profiles. The method includes: accessing an application having multiple executables for the same function for multiple use profiles. The method includes: executing code for a first use profile; receiving a prompt to change to a second use profile; suspending the execution of the code for the first use profile; retrieving switching code from a pre-computed data structure, wherein the switching code is for carrying out operations to transfer from executing code for a first use profile to executing code for a second use profile; performing the operations of the switching code; and resuming executing the application by executing code for the second use profile.

17 Claims, 8 Drawing Sheets

(56) References Cited

U.S. PATENT DOCUMENTS

| | | | | |
|---|---|---|---|---|
| 2003/0115580 | A1* | 6/2003 | Arai | G06F 8/443 717/158 |
| 2005/0188362 | A1* | 8/2005 | Metzger | G06F 8/54 717/151 |
| 2007/0157178 | A1* | 7/2007 | Kogan | G06F 8/443 717/130 |
| 2007/0226722 | A1* | 9/2007 | Chou | G06F 8/443 717/158 |
| 2008/0092128 | A1* | 4/2008 | Corry | G06F 8/443 717/158 |
| 2009/0187887 | A1* | 7/2009 | Richins | G06F 9/445 717/120 |
| 2010/0115494 | A1* | 5/2010 | Gorton, Jr. | G06F 11/3466 717/128 |
| 2011/0276954 | A1* | 11/2011 | Fontenot | G06F 8/47 717/151 |
| 2012/0174124 | A1* | 7/2012 | Ward | G06F 8/71 719/331 |
| 2014/0181591 | A1 | 6/2014 | Bijanki et al. | |
| 2015/0178085 | A1* | 6/2015 | Hertzberg | G06F 9/30189 712/222 |
| 2015/0339119 | A1* | 11/2015 | Rehman | G06F 8/54 717/121 |

OTHER PUBLICATIONS

Reducing code size explosion through low-overhead specialization Minhaj Ahmad Khan and Henri-Pierre Charles Published: 2007.*

Runtime Optimization utilizing Program Structure Naga Pavan Kumar Gorti and Arun K. Somani Published: 2012.*

Adaptive Parallelization and Optimization for the Jamaica Chip Multi-Processor Architecture Jisheng Zhao Chapters 1, 5, and 8 Published: 2007.*

Scenario Based Optimization: A Framework for Statically Enabling Online Optimizations Jason Mars and Robert Hundt (Year: 2009).*

Online Phase-Adaptive Data Layout Selection Chengliang Zhang and Martin Hirzel (Year: 2008).*

Auto-Tuning Complex Array Layouts for GPUs Nicolas Weber and Michael Goesele (Year: 2014).*

Dynamic Code Management: Improving Whole Program Code Locality in Managed Runtimes Xianglong Huang, Brian T Lewis, and Kathryn S McKinley (Year: 2006).*

Efficient Code Distribution in Wireless Sensor Networks Niels Reijers and Koen Langendoen (Year: 2003).*

Enhanced Operating System Security Through Efficient and Fine-grained Address Space Randomization Cristiano Giuffrida, Anton Kuijsten, and Andrew S. Tanenbaum (Year: 2012).*

Exploiting Procedure Level Locality to Reduce Instruction Cache Misses Ravi V. Batchu and Daniel A. Jimenez (Year: 2004).*

C. Badea, "Leveraging profile-selected execution patterns for optimized code execution in resource-constrained systems", Center for Embedded and Cyber-Physical Systems University of California, Sep. 7, 2010, p. 1.

K. Vaswani, et al.,"Dynamic Recompilation and Profile-Guided Optimisations for a .Net JIT Compiler", IEEE Proceedings, vol. 150, No. 5, Oct. 2003, p. 1-7.

Anonymous; "Profile-Guided Optimizations"; Visual Studio, Microsoft (2015); 3 pages; <https://softwareintel.com/en-us/node/512789>.

Oaks; "Chapter 4: Working with the JIT Compiler"; Java Performance: The Definitive Guide by Scott Oaks; Published by O'Reilly Media, Inc. (2014); 36 pages; <https://www.safaribooksonline.com/library/view/java-performancethe/9781449363512/ch04.html>.

* cited by examiner

US 10,452,428 B2

APPLICATION EXECUTION WITH OPTIMIZED CODE FOR USE PROFILES

BACKGROUND

The present invention relates to application execution optimization for different use profiles, and more specifically, application execution with switching to optimized code for different use profiles.

Dynamic optimization of code in its final run-time environment is known using on-line profiling. The profiling and optimizations incur an overhead on the execution of the user code.

Off-line processing is known in the form of Profile-Guided Optimization that allows software developers to test optimized code before it is rolled out into production. Separate profiles may be created for each use profile to ensure the best possible performance for that particular use case.

SUMMARY

According to a first aspect of the present invention there is provided a computer-implemented method for software application execution including switching between optimized code for use profiles, comprising: accessing an application having multiple executables for the same function for multiple use profiles; executing code for a first use profile; receiving a prompt to change to a second use profile; suspending the execution of the code for the first use profile; retrieving switching code from a pre-computed data structure, wherein the switching code is for carrying out operations to transfer from executing code for a first use profile to executing code for a second use profile; performing the operations of the switching code; and resuming executing the application by executing code for the second use profile.

According to a second aspect of the present invention there is provided a system for software application execution including switching between optimized code for use profiles, comprising: a processor and a memory configured to provide computer program instructions to the processor to execute the function of the components; an application accessing component for accessing an application having multiple executables for the same function for multiple use profiles; a code executing component for executing code for a first use profile; a prompt receiving component for receiving a prompt to change to a second use profile; a suspending component for suspending the execution of the code for the first use profile; a switching code retrieving component for retrieving switching code from a pre-computed data structure, wherein the switching code is for carrying out operations to transfer from executing code for a first use profile to executing code for a second use profile; a switching component for performing the operations of the switching code; and wherein the executing component resumes executing the application by executing code for the second use profile.

According to a third aspect of the present invention there is provided a computer program product for software application execution including switching between optimized code for use profiles, the computer program product comprising a computer readable storage medium having program instructions embodied therewith, the program instructions executable by a processor to cause the processor to: access an application having multiple executables for the same function for multiple use profiles; execute code for a first use profile; receive a prompt to change to a second use profile; suspend the execution of the code for the first use profile; retrieve switching code from a pre-computed data structure, wherein the switching code is for carrying out operations to transfer from executing code for a first use profile to executing code for a second use profile; perform the operations of the switching code; and resume executing the application by executing code for the second use profile.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Methods and systems are described which provide an efficient way of switching between pre-computed use profiles while an application is running, with as small overhead as possible.

The described methods involve a pre-processing method for generating switching code for switching between pairs of use profiles and a runtime method for switching between two use profiles during execution of the application.

Figure 1:
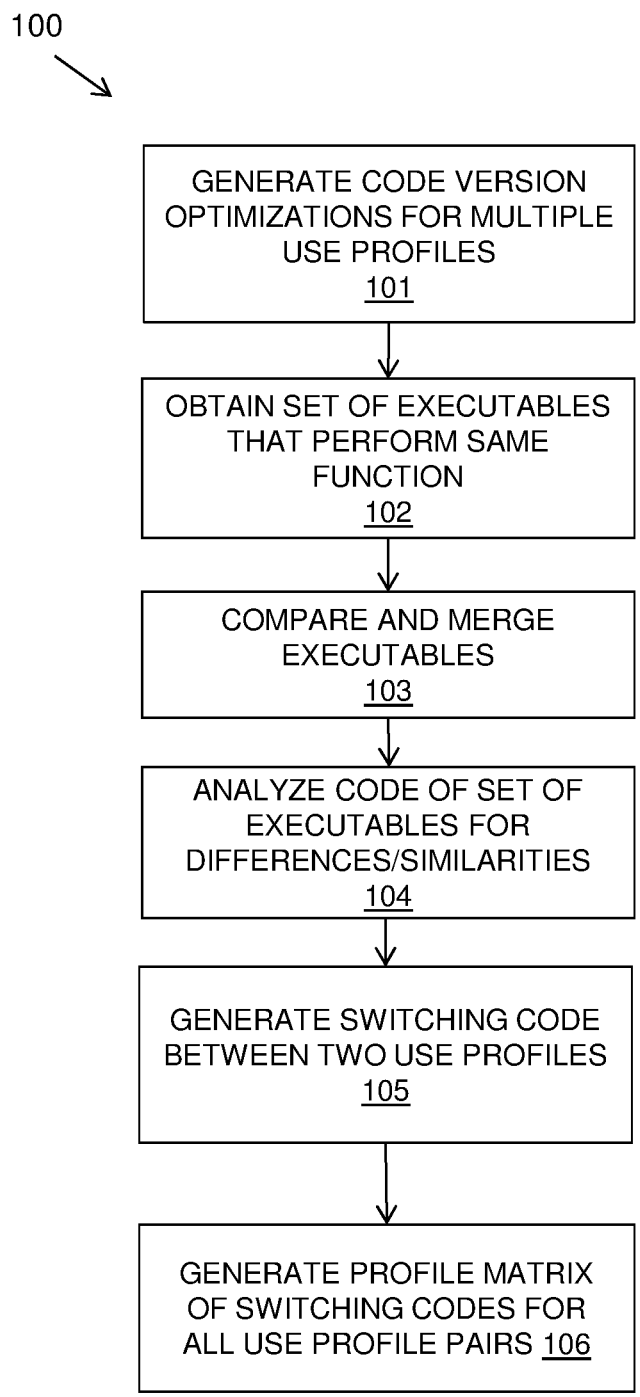
FIG. 1 is a flow diagram of an example embodiment of an aspect of a method in accordance with the present invention.

Referring to FIG. 1, a flow diagram 100 illustrates an example embodiment of the pre-processing method.

As part of the software production process, developers may prepare a set of potential use cases in which they expect their application to be used. They may use the profile-guided optimization (PGO) feature of a compiler to generate 101 optimized versions of the application code for each respective use profile. This may obtain 102 a set of executables that perform the same function, but for each potential use profile, there is an optimized version that performs that particular use case the best. An executable is a set of instructions that causes a computer to perform tasks.

The influence of code caching may be considered during the use profile optimization. As jumps or calls within the cache can be expected to be significantly cheaper than jumps or calls to un-cached pages, it is important to optimize the runtime code layout so that code units that frequently cross-call each other can all be fitted in the appropriate caches at the same time. Due to the complex nature of cache performance, it is likely that an off-line optimizer can do a better job at ensuring optimal cache usage than a processor-constrained online method.

The different executables may be compared and merged 103 into a single "multi-profile" executable, whose exact format may be dependent on the host operating system. A low-level analysis of the code contained within each executable may be performed 104 with differences and/or similarities between the executables being identified and recorded. In particular, special consideration may be given to the appearance of various sections of code and data after they have been loaded into memory during normal execution. Sections of code may be units of code generated by the compiler for a single function or method definition.

Switching code may be generated 105 between each pair of use profiles. The switching code may be generated off-line by loading both the first use profile being switched from as well as the second use profile being switched to in memory, and examining the differences between their respective layouts. Such switching code may typically consist of operations that simply relocate memory blocks, update relocation addresses, and possibly change code or data areas if there is a difference between the respective code/data sections of the two profiles being switched between. Pre-generated switching code may be executed significantly faster than simply overlaying the entire new use profile on the previous one, due to the expected high degree of similarity between the two.

The switching codes may be organized 106 into a profile matrix in the form of a pre-computed data structure that facilitates switching between two profiles during execution.

For each pair of profiles, the matrix may contain a set of instructions to be performed in order to achieve a switch from a first use profile to a second use profile, including mapping the values of processor registers from their respective pre-switch states to the intended post-switch states.

The instructions that may be performed include those carried out when the executable or shared library is first loaded into memory, such as loading code or data, or performing relocations. The switching instructions do not perform useful work from the viewpoint of the application; they merely load the second use profile into memory.

Figure 2:
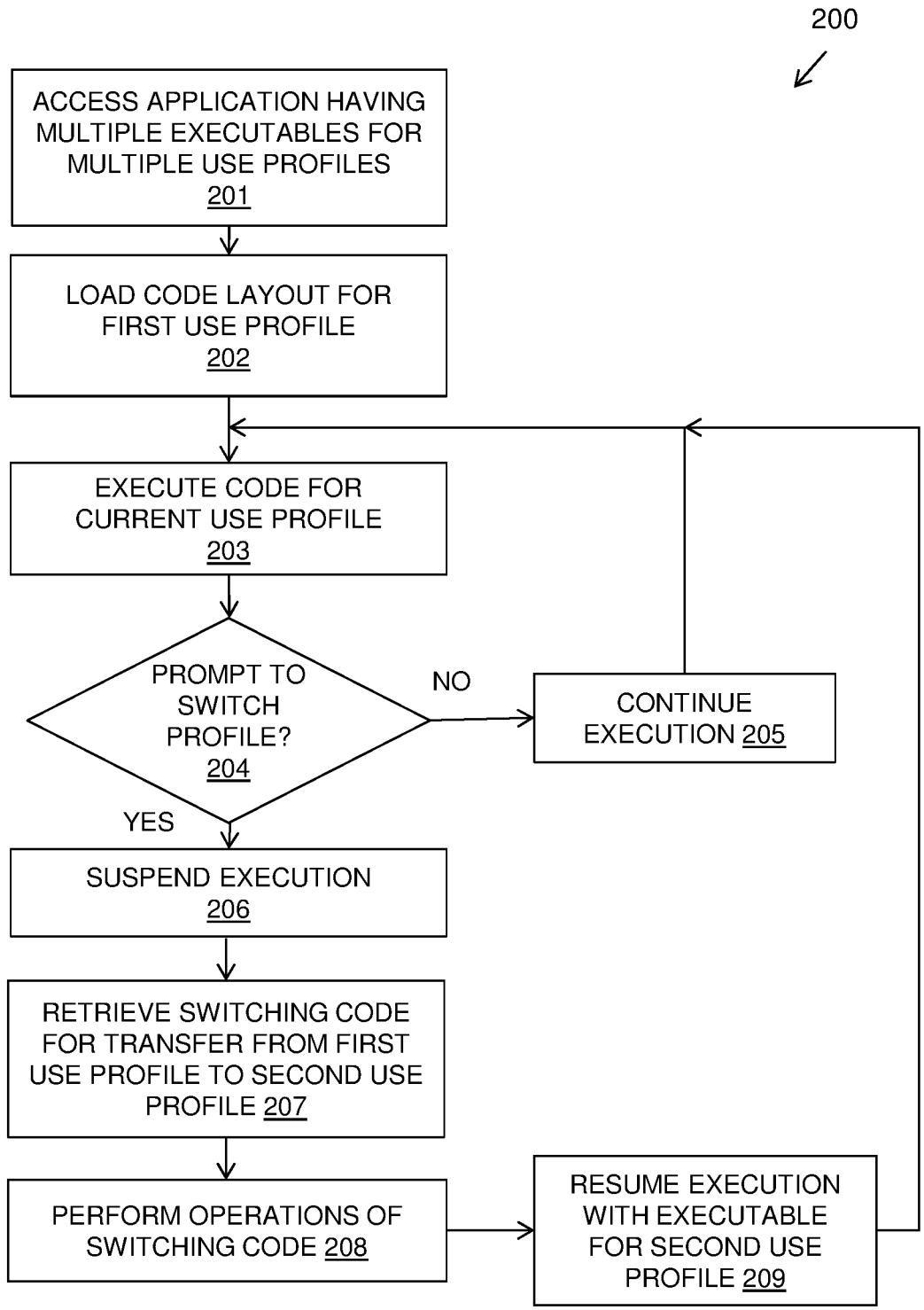
FIG. 2 is a flow diagram of an example embodiment of a further aspect of a method in accordance with the present invention.

Referring to FIG. 2, a flow diagram 200 illustrates an example embodiment of the runtime method for switching between two use profiles during execution of an application. As shown at block 201, an application may be accessed that has multiple executables for multiple use profiles as developed off-line.

The initial code layout for the first use profile may be loaded, as shown at block 202, which may include from executable files, dynamic libraries, or other means. The use profiles apply to momentary memory layouts, after all the symbols necessary for executing a section of code have been loaded from executable file(s) and/or dynamic libraries. At this point, the unit of code is ready for execution, and also for profile switching. Next, as shown at block 203, the code for the current use profile may be executed.

As shown at decision block 204, it may be determined if a prompt to switch use profiles is received. The prompt may be received from an external procedure and may designate a second use profile which is to be switched to. If there is no prompt to switch use profiles, then the application may continue execution for the first use profile, as shown at block 205. If there is a prompt to switch profiles, the execution of the application may be suspended, as shown at block 206. Next, as shown at block 207, the switching code for switching from the first use profile to the second use profile may be retrieved from the pre-computed matrix profile data structure. The operations of the switching code may be performed, as shown at block 208.

Whether profile switching can be performed collectively on all modules (i.e., executables and dynamic libraries) used by a program, or just a single module may depend on how the modules were loaded. If several programs are using the same address space loaded originally from a dynamic library, then changing the layout of this shared module may adversely affect the other programs. Therefore it is likely that profile switching may only operate inside the address space of a single module (executable or dynamic library).

However, the profile switcher may make a copy of an appropriate section of code in the address space of a dynamic library, and copy it to a more suitable location within the address space of the program for enhancing runtime performance. As shown at block 209, the execution of the application may be resumed with executables for the second use profile. The method 200 may loop to execute current code and may receive a further prompt to switch profiles at a later time.

For the duration of the switchover, the running application is effectively suspended, and all processing state is preserved. The switch code is able to map the current processing state to the new processing state. The second use profile being switched to is able to continue execution from the new processing state, even in multiprocessing environments.

Mapping to a new processing state is complex if the running application is suspended at an arbitrary point; however, this is typically not necessary. Provided that the code in various profiles performs exactly the same function, the compiler may designate appropriate switchover points where execution may be suspended and all environmental factors mapped to their equivalents in the use profile being switched to.

The entire process requires coordination from the operating system level. In particular, scheduling the threads of the application while they are in the process of stopping needs operating system level control of the state in which the threads are suspended.

Figure 3:
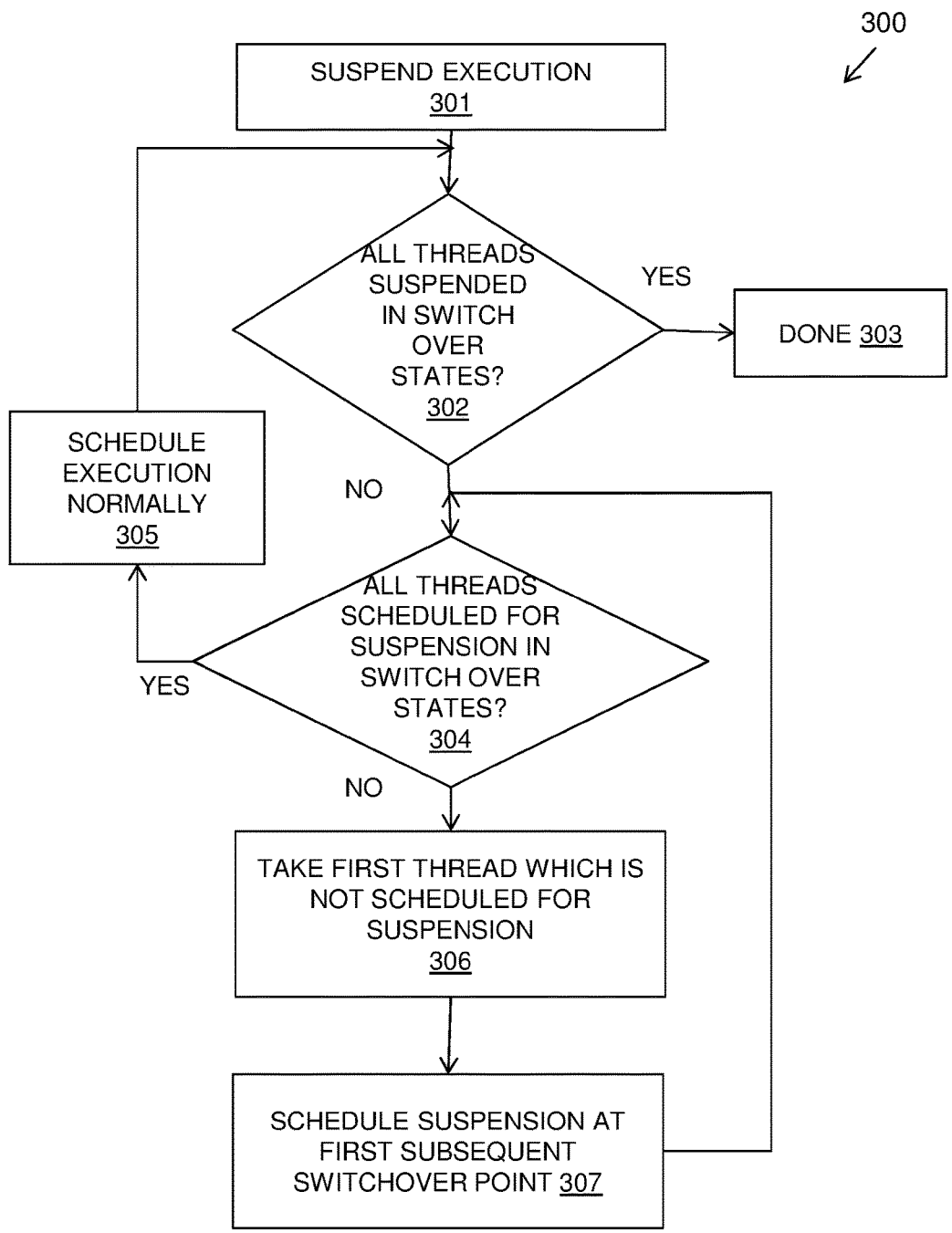
FIG. 3 is a flow diagram of an example embodiment of a further aspect of a method in accordance with the present invention.

Referring to FIG. 3, a flow diagram illustrating an example embodiment of a method 300 for the suspension of execution in FIG. 2 is shown. As shown at block 301, the method 300 includes suspending the execution of the application. Next, as shown at decision block 302, it may be determined if all threads are suspended in switchover states. If all threads are suspended then the method 300 may terminate, as shown at block 303.

If not all the threads are suspended, then it may be determined, at decision block 304, if all threads scheduled for suspension in a switchover state. If so, execution may be scheduled normally, as shown at block 305, and the method 300 may loop to decision block 302 to determine if all threads are suspended in switchover states. If not all threads are scheduled for suspension in a switchover state, then the first thread is taken, as shown at decision block 306, which is not scheduled for suspension and suspension may be scheduled, as shown at decision block 307, at a first subsequent switchover point. The method 300 may loop to again determine if all threads scheduled for suspension in a switchover state, as shown at decision block 304.

For example in use profile A, foo( ) and bar( ) call each other frequently, so they need to be in close memory range of each other. In use profile B, bar( ) and baz( ) call each other frequently, but foo( ) is almost idle, so the PGO advises that the code for bar( ) and baz( ) need to be close. They may be sufficiently lengthy to prevent all three of them being within this optimum threshold.

It may be required to switch from use profile A to use profile B at runtime. Therefore, there may be a need to effectively move the code of foo( ) and baz( ) perhaps change the relocations in bar( ) but may not need to touch quux( ) and xyzzy( ). So it is not worth re-loading the whole new executable, but following the pre-computed set of instructions may enable the switching of executables. This may take the following form load foo( ) at 0xABCD
load baz( ) at 0xBCDE
set offset+17 in bar( ) to the new address of foo( )
set offset+29 in bar( ) to the new address of baz( )
set offset+14 in foo( ) to bar( )
set value of static pointer declared at +8 in foo( ) to the base address of object @0x34598347 (taken from the old foo( )).
n–k. discard old foo( )
n–k+1. discard old baz( )

Generating instructions 1 to 5 may be straightforward; however, instruction 6 and similar instructions may be harder and are likely to result in restrictions on what code may be run.

The set of instructions is pre-computed for each pair of profiles (i.e., switching from A to B, switching from A to C, from A to D, from B to D, etc.), so when the switch happens, the very minimal runtime that needs to be incorporated in the executable loads the appropriate set of instructions, runs it, and resumes all threads in their new execution contexts.

The described methods and systems provide a pre-computed, limited set of PGO use profiles based, as deemed appropriate by the developers of the application. Multiple pre-optimized executables are generated for the use profiles, all containing only native code. In practice, this would be in the order of a few tens of different executables, so that each could be analyzed and properly tested before shipping.

The described method is aimed at a set of optimizations that include code layout in memory and code in-lining. The set of executables or variants may be generated off-line, and the method addresses the problem of switching to the variant most suitable to the momentary circumstances of the production environment.

There are numerous specific optimization techniques performed by modern compilers, but of particular interest to this method are code in-lining and code layout that allows frequently called code to reside near the call site in memory, allowing the use of short-range jump/call instructions instead of more expensive long-range ones. Both of these techniques involve trade-offs: a decision to use a particular layout may improve performance in certain use cases, but degrade it in others. Also, in-lining the same code at several call sites may cause memory bloat. Therefore, the optimal code layout will be different for the potential use cases of an application.

Conventional on-line optimizations take significant processing power from the executing application, and their behavior is not always completely predictable. Moreover, the optimizations will always be tailored to the code being executed, as it is being executed. In reality, it may be more desirable to allow the application developer guide the optimizations using specific test cases.

At the opposite end of the spectrum where source code is compiled to native code, for example, using PGO, may result in an executable that cannot adapt during runtime to significant changes in requirements such as, for example, a new application, new type of workload, etc.

Having the pre-computed use profiles and switching operations means that no compilation needs to occur at run-time and all processing power is available to the application.

Most work required for performing the address relocations in the executable code; this is normally done at application startup by the relocating loader. The pre-computation in this context means that instead of having to completely wipe out the old code (which would likely require stopping execution completely and losing a lot of application state), then load the new one from disk and modify all call/jump/etc. addresses as specified by the relocation table, the compiler may generate a profile matrix giving specific instructions for whatever needs to be done for switching from profile A to profile B.

The code optimizations for use profiles and the profile matrix are pre-computed off-line by the compiler. The offline optimization can use virtually unlimited CPU power, and furthermore, the developers can freely choose what input they want to feed into the optimizer. The result is that the performance characteristic can be verified in advance, and some potentially stochastic behavior is eliminated.

The described method uses the adaptability of Just-In-Time compilation in combination with the high performance of the off-line optimization carried out by profile-guided optimizing compilers. The desired effect is achieved by creating multiple versions of the executable code, all optimized off-line, then continuously monitoring the run-time environment and selecting the most appropriate version for the momentary circumstances.

The different use profiles may share significant areas of common code that would appear as redundant copies if the different profiles were represented using full copies of the executable. Other pieces of code may appear multiple times with small variations such as differences in alignment, relocation addresses, small subsets of instructions, etc. Only under rare circumstances will the different profiles represent code performing the same function in vastly different ways. Taking advantage of such similarities not only reduces the amount of storage space required to store the full set of profiles, but it also reduces the time it takes to switch from one profile to another while the application is executing.

Figure 4:
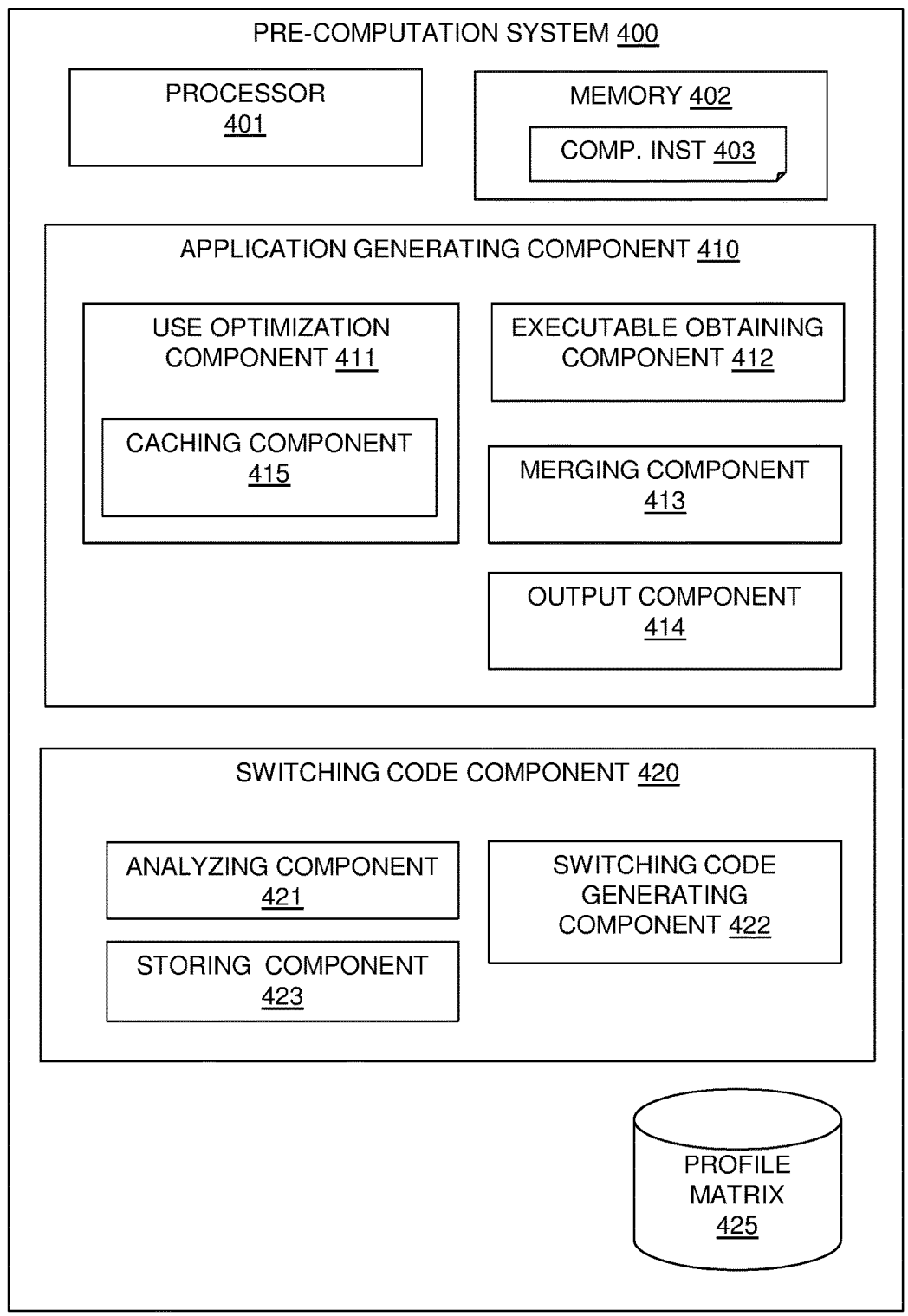
FIG. 4 is block diagram of an example embodiment of an aspect of a system in accordance with the present invention.

Referring to FIG. 4, a block diagram shows a pre-computation system 400 for preparing an application for optimization for pre-defined use profiles and a profile matrix of switching code for switching between the pre-defined use profiles.

The pre-computation system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

An application generating component 410 may be provided by the pre-computation system 400 for developing an application with executables optimized for multiple pre-defined use profiles. The application generating component 410 may include a use optimization component 411 for preparing optimized versions of the application code for each use profile. The use optimization component 411 may include a caching component 415 for optimizing caching of pages within the application.

The application generating component 410 may include an executable obtaining component 412 for obtaining a set of executables that perform the same function of the application code for the use profiles. The application generating component 410 may include a merging component 413 for comparing and merging the set of executables and an output component 414 for providing the merged sets of executables.

The pre-computation system 400 may include a switching code component 420 for providing switching code for the application. The switching code component 420 may include an analyzing component 421 for analyzing code of each of the set of executables output by the output component 414 of the application generating component 410. The analyzing component 421 may analyze the executables that perform the same function to determine differences and/or similarities of the executables with consideration of the appearance of sections of the code and data after they have been loaded into memory during normal execution.

The switching code component 420 may include a switching code generating component 422 for generating switching code based on the analysis of the sets of executables for switching between pairs of use profiles, and a storing component 423 for storing the switching code between pairs of use profiles in a profile matrix 425 as a pre-computed data structure for access by an application during execution.

Figure 5:
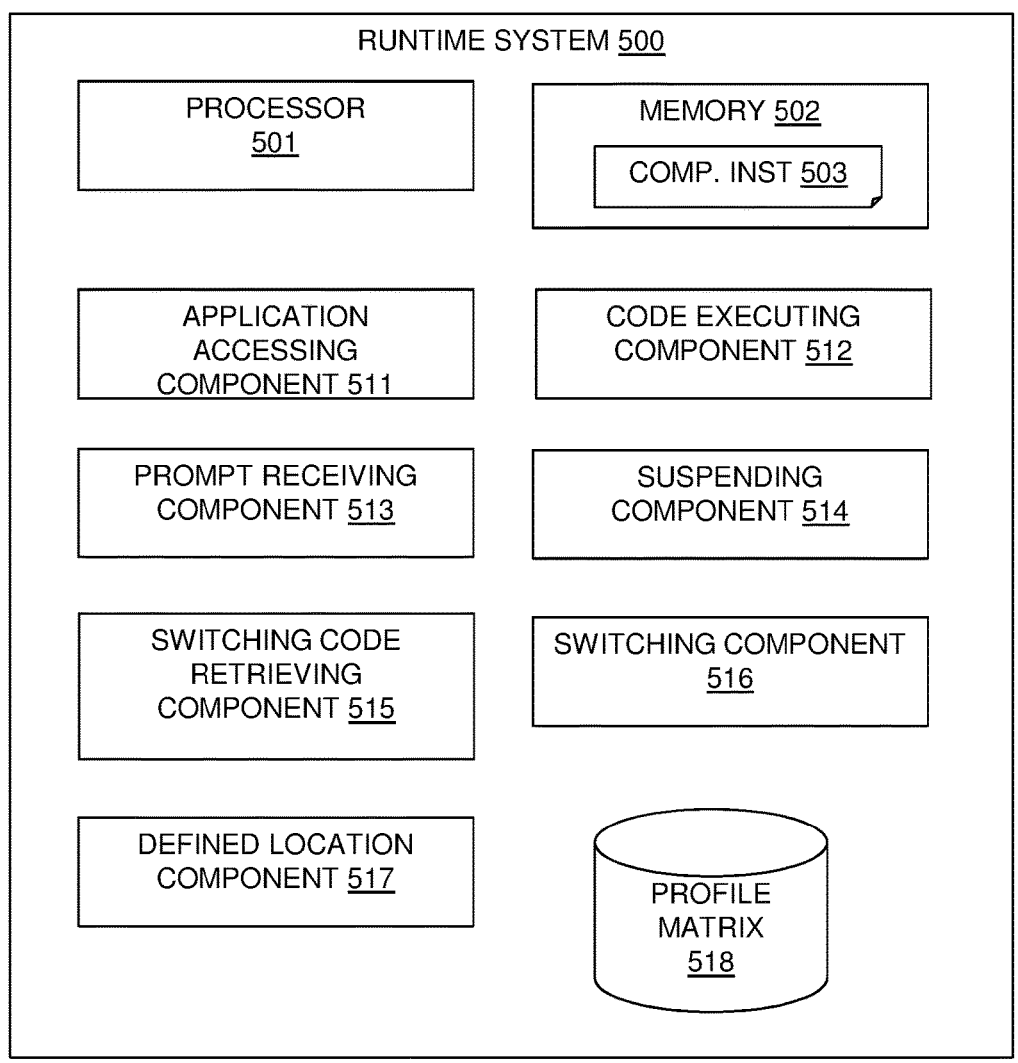
FIG. 5 is block diagram of an example embodiment of another aspect of a system in accordance with the present invention.

Referring to FIG. 5, a block diagram shows a runtime system 500 executing an application for a first use profile and applying switching code for switching between pre-defined use profiles.

The runtime system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 403 to the at least one processor 501 to carry out the functionality of the components.

The runtime system 500 may include an application accessing component 511 for accessing an application having multiple executables for the same function for multiple use profiles.

The runtime system 500 may include a code executing component 512 for executing code for a first use profile and a prompt receiving component 513 for receiving a prompt to change to a second use profile. The runtime system 500 may include a suspending component 514 for suspending the execution of the code for the first use profile. The runtime system 500 may include a defined location component 517 for, after receiving a prompt to change to a second use profile, continuing executing the code for the first use profile until a pre-defined location of the code is reached which is suitable for switching executions of the use profiles.

The runtime system 500 may include a switching code retrieving component 515 for retrieving switching code from a profile matrix 518 in the form of a pre-computed data structure which stores the switching code for pairs of use profiles including required operations to transfer from executing code for a first use profile to executing code for a second use profile. The runtime system 500 may also include a switching component 516 for performing the operations of the switching code.

The code executing component 512 may then resumes executing the application by executing code for the second use profile.

Figure 6:
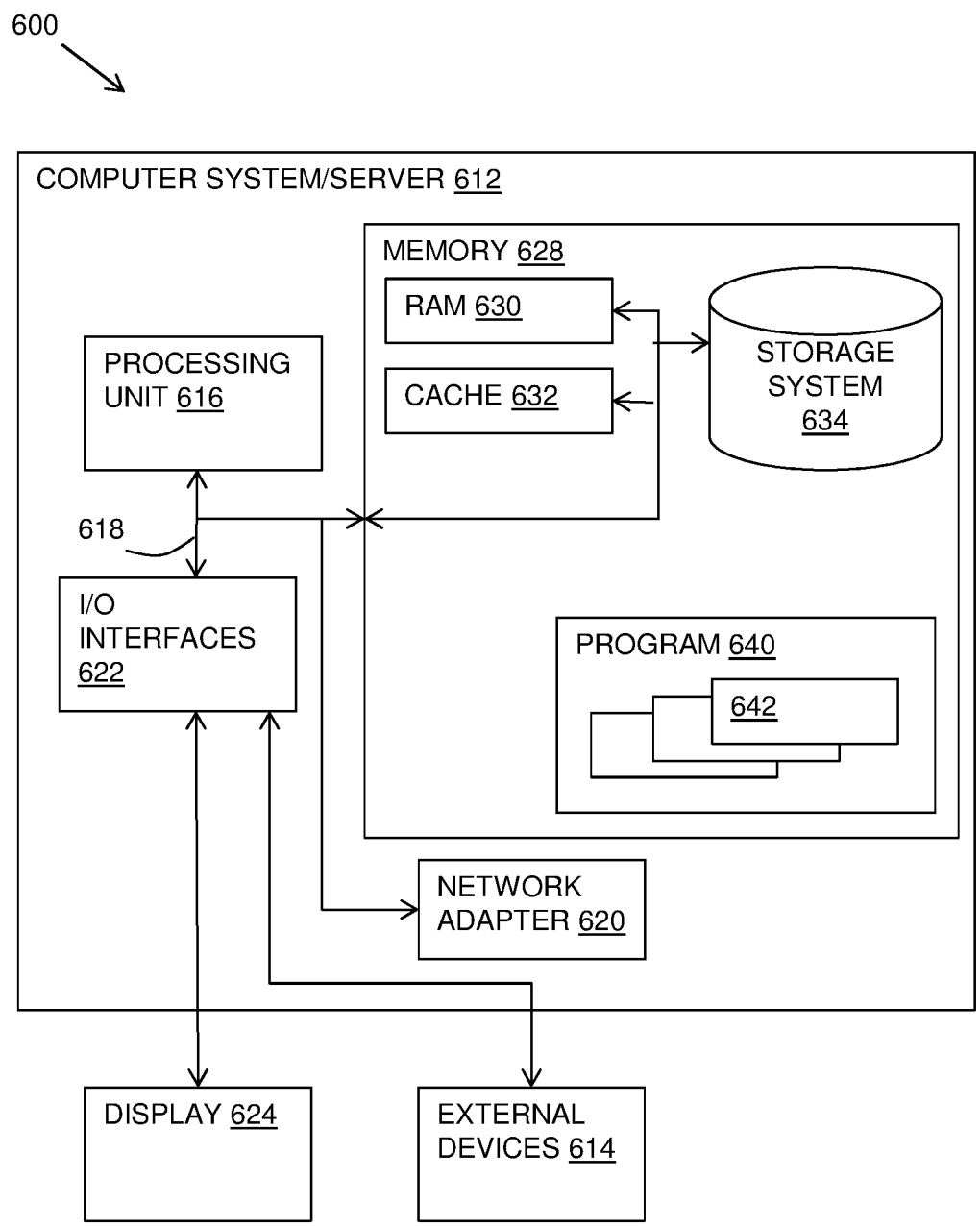
FIG. 6 is a block diagram of an embodiment of a computer system or cloud server in which the present invention may be implemented.

Referring now to FIG. 6, a schematic of an example of a system 600 in the form of a computer system or server is shown in which the described pre-computation system 400 or runtime system 500 may be implemented.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632.

Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
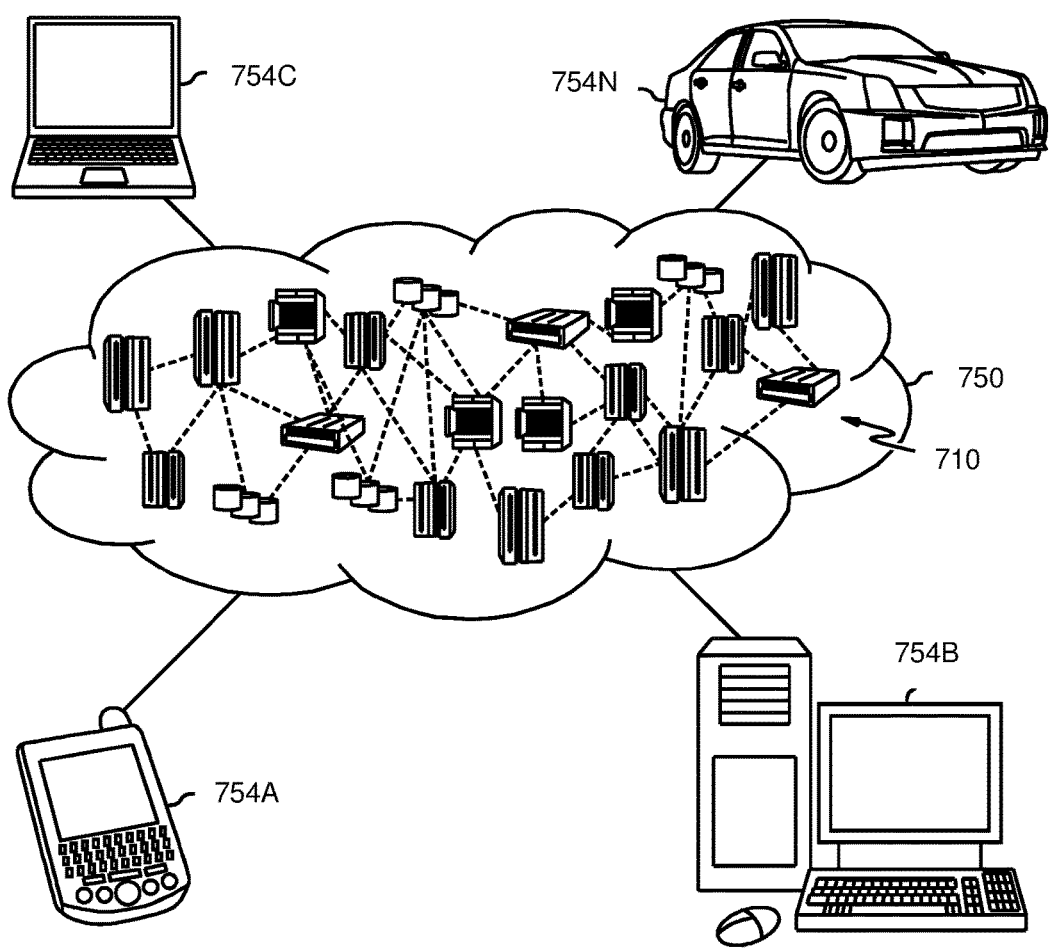
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
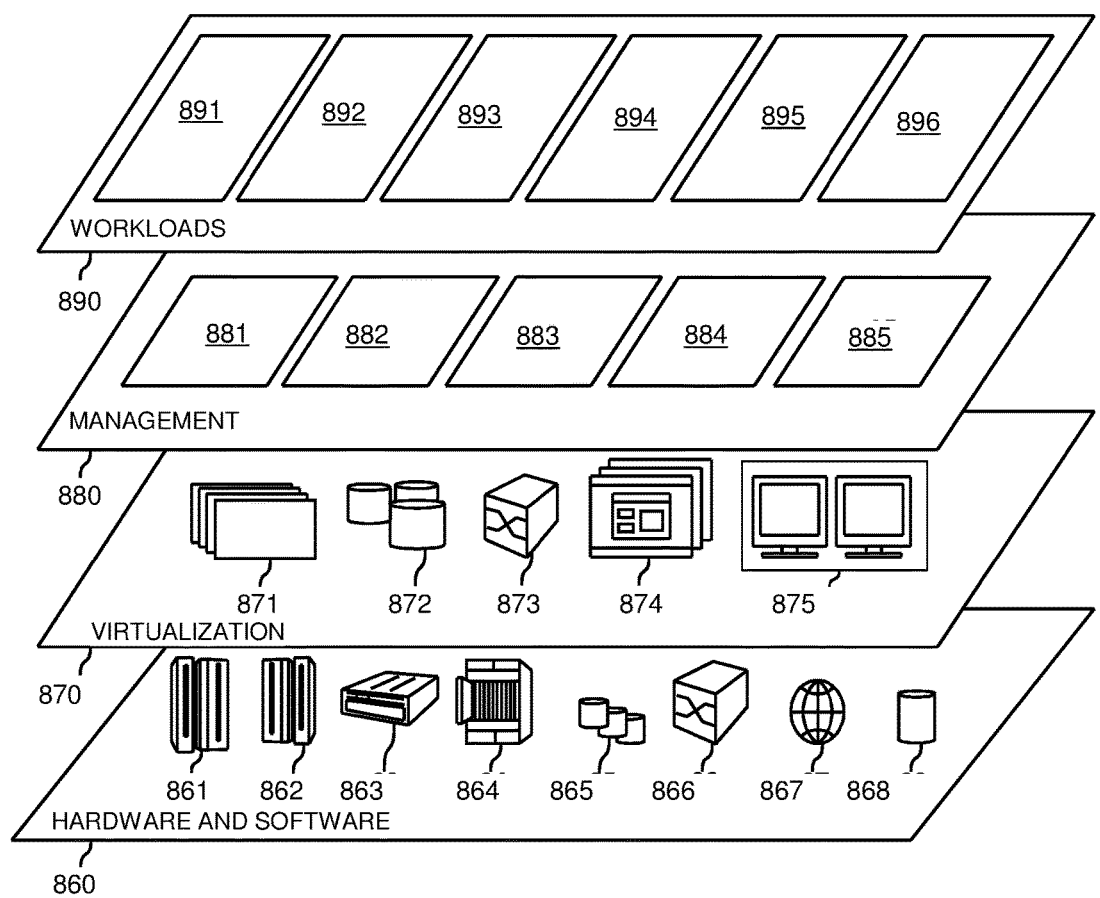
FIG. 8 is a diagram of abstraction model layers of a cloud computing environment in which the present invention may be implemented.

Referring now to FIG. 8, a set of functional abstraction layers provided by cloud computing environment 750 (FIG. 1) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and software execution including swapping between executables for predefined use profiles 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for software application execution including switching between optimized code for use profiles, comprising:
    storing an application having multiple executable versions for the same function, wherein the executable code and memory layout of each version corresponds to a respective one multiple use profiles including at least three use profiles;
    storing a profile matrix associated with the application, the profile matrix comprising a pre-computed data structure including switching codes configured to transfer from the memory layout of one of the at least three use profiles to the memory layout of another one of the at least three use profiles and wherein the profile matrix includes switching codes for each pair within the at least three use profiles;
    accessing the application and executing code for a first use profile of the multiple use profiles;
    receiving a prompt to change to a second use profile of the multiple use profiles, wherein the prompt includes an identification of the second use profile; and
    responsive to receiving the prompt, performing a process to switch to the second use profile including:
        suspending the execution of the code for the first use profile;
        retrieving the switching code from the profile matrix for carrying out operations to transfer from the first use profile to the second use profile;
        performing the operations of the retrieved switching code; and
        resuming executing the application by executing the code for the second use profile.

2. The method as claimed in claim 1, including, after receiving a prompt to change to a second use profile, continuing executing the code for the first use profile until a predefined location of the code is reached, then suspending the execution of the code for the first use profile.

3. The method as claimed in claim 2, wherein resuming executing the application by executing code for the second use profile, resumes from a pre-defined location.

4. The method as claimed in claim 1, including:
generating the application having the multiple executable versions for the same function, wherein the generating includes:
preparing a set of executables that perform the same function when executed, wherein each executable of the set of executables is an executable version of the application optimized for a respective use profile of the multiple use profiles;
comparing and merging the set of executables; and
providing the merged set of executables as the application having the multiple executable versions.

5. The method as claimed in claim 4, wherein preparing optimized versions of the application code for each use profile includes creating a code layout which optimizes the caching of pages within the application.

6. The method as claimed in claim 1, including:
generating the switching code based on an analysis of the executables for each pair within the at least three use profiles, the analysis including loading the executables for each pair into memory and identifying differences between the respective memory layouts of the pair.

7. The method as claimed in claim 1, wherein performing the operations of the switching code includes copying a section of code in an address space of a dynamic library if this section of code is being used by other applications.

8. The method as claimed in claim 1, wherein the method is provided as a service in a cloud environment.

9. A system for software application execution including switching between optimized code for use profiles, comprising:
a computer readable storage medium configured to store an application having multiple executable versions for the same function, wherein the executable code and memory layout of each version corresponds to a respective one multiple use profiles including at least three use profiles, and configured to store a profile matrix associated with the application, the profile matrix comprising a pre-computed data structure including switching codes configured to transfer from the memory layout of one of the at least three use profiles to the memory layout of another one of the at least three use profiles and wherein the profile matrix includes switching codes for each pair within the at least three use profiles;
a processor and a memory configured to provide computer program instructions to the processor to:
access the application and execute code for a first use profile of the multiple use profiles;
receive a prompt to change to a second use profile of the multiple use profiles, wherein the prompt includes an identification of the second use profile;
responsive to receiving the prompt, perform a process to switch to the second use profile including:
suspending the execution of the code for the first use profile;
retrieving switching code from the profile matrix for carrying out operations to transfer from the first use profile to the second use profile;
performing the operations of the retrieved switching code; and
resuming executing the application by executing the code for the second use profile.

10. The system as claimed in claim 9, wherein the processor is further configured to continue executing the code for the first use profile, after receiving a prompt to change to a second use profile, until a pre-defined location of the code is reached, then to suspend the execution of the code for the first use profile.

11. The system as claimed in claim 9, wherein the processor is further configured to generate the application having the multiple executable versions for the same function by:
preparing a set of executables that perform the same function when executed, wherein each executable of the set of executables is an executable version of the application optimized for a respective use profile of the multiple use profiles;
comparing and merge the set of executables; and
providing the merged set of executables as the application having the multiple executable versions.

12. The system as claimed in claim 11, wherein preparing optimized versions of an application code for each use profile includes creating a code layout which optimizes the caching of pages within the application.

13. The system as claimed in claim 9, wherein the processor is further configured to generate the switching code based on an analysis of the executables for each pair within the at least three use profiles, the analysis including loading the executables for each pair into memory and identifying differences between the respective memory layouts of the pair.

14. A computer program product for software application execution including switching between optimized code for use profiles, the computer program product comprising a computer readable storage medium having program instructions embodied therewith, the program instructions executable by a processor to cause the processor to:
store an application having multiple executable versions for the same function, wherein the executable code and memory layout of each version corresponds to a respective one multiple use profiles including at least three use profiles;
store a profile matrix associated with the application, the profile matrix comprising a pre-computed data structure including switching codes configured to transfer from the memory layout of one of the at least three use profiles to the memory layout of another one of the at least three use profiles and wherein the profile matrix includes switching codes for each pair within the at least three use profiles;
access the application and execute code for a first use profile of the multiple use profiles;
receive a prompt to change to a second use profile of the multiple use profiles, wherein the prompt includes an identification of the second use profile; and
responsive to receiving the prompt, perform a process to switch to the second use profile including:
suspending the execution of the code for the first use profile;
retrieving the switching code from the profile matrix for carrying out operations to transfer from the first use profile to the second use profile;
performing the operations of the retrieved switching code; and
resuming executing the application by executing the code of the second use profile.

15. The computer program product as claimed in claim 14, wherein the program instructions further include program instructions executable by a processor to continue executing the code for the first use profile, after receiving a prompt to change to a second use profile, until a pre-defined location of the code is reached, then to suspend the execution of the code for the first use profile.

16. The computer program product as claimed in claim 14, wherein the program instructions further include program instructions executable by a processor to generate the application having the multiple executable versions for the same function by:
    preparing a set of executables that perform the same function when executed, wherein each executable of the set of executables is an executable version of the application optimized for a respective use profile of the multiple use profiles;
    comparing and merge the set of executables; and
    providing the merged set of executables as the application having the multiple executable versions.

17. The computer program product as claimed in claim 14, wherein the program instructions further include program instructions executable by a processor to generate the switching code based on an analysis of the executables for each pair within the at least three use profiles, the analysis including loading the executables for each pair into memory and identifying differences between the respective memory layouts of the pair.

* * * * *